(12) United States Patent
Scheckelhoff et al.

(10) Patent No.: US 7,506,573 B2
(45) Date of Patent: Mar. 24, 2009

(54) MID-POWER SPRING BRAKE ACTUATOR HAVING FUSE-COLLAR DESIGN FOR SAFETY

(75) Inventors: Ken E. Scheckelhoff, Elyria, OH (US); Ron S. Plantan, Westlake, OH (US); Brett S. Darner, Wellington, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 348 days.

(21) Appl. No.: 11/543,192

(22) Filed: Oct. 5, 2006

(65) Prior Publication Data

US 2008/0083325 A1    Apr. 10, 2008

(51) Int. Cl.
F01B 7/00    (2006.01)
(52) U.S. Cl. .......................................... 92/63
(58) Field of Classification Search .................. 92/63, 92/64
See application file for complete search history.

(56) References Cited

U.S. PATENT DOCUMENTS

| | | | |
|---|---|---|---|
| 3,498,174 A | 3/1970 | Schuster et al. | |
| 4,263,840 A | 4/1981 | Herrera | |
| 5,507,093 A | 4/1996 | Wittenstein et al. | |
| 5,655,431 A | 8/1997 | Pierce et al. | |
| 5,685,200 A | 11/1997 | Baumann | |
| 6,217,222 B1 | 4/2001 | Mattson et al. | |
| 2006/0131116 A1 | 6/2006 | Plantan et al. | |

Primary Examiner—F. Daniel Lopez
(74) Attorney, Agent, or Firm—Crowell & Moring LLP

(57) ABSTRACT

A mid-power spring brake actuator includes first, second, and third actuator housing portions, with the first actuator housing portion interposed between the second and third housing portions. A parking brake release actuator is received within the third housing portion, and a connecting shaft is attached at a first end to the parking brake release actuator and extends through a dividing wall defined by the first housing portion. A service brake apply actuator is received within at least one of the first and second housing portions. Between the dividing wall defined by the first housing portion and a second end of the connecting shaft, a brake actuator spring is provided, and a service brake actuation chamber is interposed between the brake actuator spring and the service brake apply actuator. A parking or emergency brake de-actuation chamber is defined between the parking brake release actuator and the first housing portion. Travel of the connecting shaft as a result of force applied by the brake actuator spring upon failure of an interconnection between the connecting shaft and the parking brake release actuator is limited so as to avoid undesired or unsafe power spring expansion or release beyond the rated power spring stroke.

22 Claims, 2 Drawing Sheets

MID-POWER SPRING BRAKE ACTUATOR HAVING FUSE-COLLAR DESIGN FOR SAFETY

BACKGROUND OF THE INVENTION

1. Field of the Invention

The present invention concerns a safety feature addressing the problem of undesired full power spring expansion upon a connecting shaft failure which may occur in mid-power-spring-type brake actuators, i.e. actuators having mid-power spring brake actuation such that a service brake actuation chamber is provided between a parking or emergency brake actuator spring and a service brake apply actuator.

2. Description of Related Art

U.S. Pat. No. 3,498,174 to Schuster et al. shows a torque-limited bolt with an inner head portion which shears off at a predetermined torque.

U.S. Pat. No. 4,263,840 to Herrera concerns a safety brake mechanism including a spring brake housing with a collapsible sleeve intended to center a spring with respect to a diaphragm.

U.S. Pat. No. 5,507,093 discloses a forged steel connecting rod with a notch formed near the crankshaft bore. During a forging process, the material is forced back into the notch to form a weakened crack area so that the rod will break along the crack and form two complimentary pieces at the crankshaft bore. These pieces would not need machining and would be held together by bolts in the final assembly.

U.S. Pat. No. 5,655,431 to Pierce et al. relates to a nut and bolt assembly for a spring brake configured so that the nut will not rotate with respect to the bolt. The nut is designed so as to have a lower torque than the bolt so that excessive torque will not be passed through. A seal is also provided to prevent contamination of the spring brake assembly.

U.S. Pat. No. 5,685,200 to Baumann concerns a metal brake pressure rod connecting a plastic pedal to a brake cylinder. The brake pressure rod has a pre-designed buckling point so that failure of the rod occurs before failure of the pedal.

U.S. Pat. No. 6,217,222 to Mattson et al. shows a bearing with a notched surface formed to ease fracturing of a part into multiple pieces. The notches are shaped such that the fractures are separated into regions and provide clean surfaces after fracture.

SUMMARY OF THE INVENTION

A mid-power brake spring brake actuator configuration according to this invention includes first, second, and third actuator housing portions, with the first actuator housing portion interposed between the second and third housing portions. A parking brake release actuator is received within the third housing portion, and a connecting shaft is attached at a first end to the parking brake release actuator and extends through a dividing wall defined by the first housing portion. A service brake apply actuator is received within at least one of the first and second housing portions. Between the dividing wall defined by the first housing portion and a second end of the connecting shaft, a brake actuator spring is provided, and a service brake actuation chamber is interposed between the brake actuator spring and the service brake apply actuator. A parking or emergency brake de-actuation chamber is defined between the parking brake release actuator and the first housing portion.

It is an object of the present invention to avoid undesired power spring expansion or release beyond desired full stroke actuator extension in a mid-power spring brake actuator configured as mentioned. This object is achieved, according to the present invention, by limiting travel of the connecting shaft as a result of force applied by the brake actuator spring upon failure of an interconnection between the connecting shaft and the parking brake release actuator so as to avoid such undesired power spring expansion or release. In the particular configuration of the invention described, the parking brake release actuator includes a parking piston having a collar defined thereon receiving the first end of the connecting shaft, and the parking piston can include a juncture or union section between the collar and a piston head section configured so as to promote failure of the interconnection at least at one predetermined location, with failure of the interconnection at the predetermined location resulting in retention of the collar on the connecting shaft upon that failure. Travel is limited by abutment between the collar and the dividing wall upon failure.

The connecting shaft may be received within the collar, and the juncture or union section can include at least one undercut defined therein which promotes failure at the predetermined location as mentioned. In the configuration illustrated, the undercut is defined in an inner circumferential surface of the juncture or main section.

The collar can be secured to the first end of the connecting shaft in one (or more) of a variety of ways, including by threads, by press-fitting, by welding, by brazing, and/or by an interlocking connection.

DETAILED DESCRIPTION OF THE DRAWINGS

Figure 1:
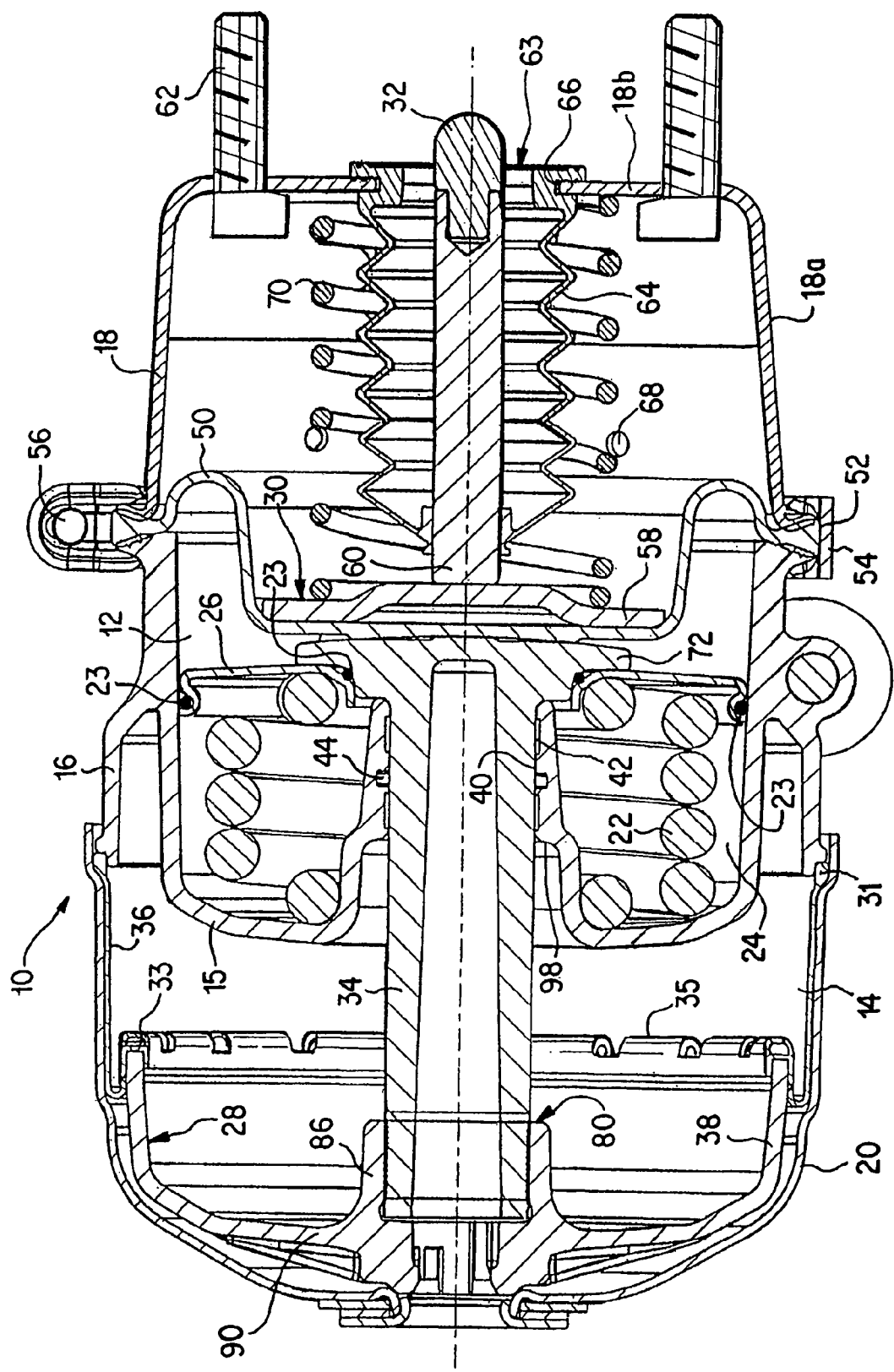
FIG. 1 is a side sectional view of a mid-power spring brake actuator according to the invention.

The manner in which a fuse-collar cooperates with other components of a mid-power spring brake actuator according to the present invention is most readily apparent from FIG. 1, which provides a cross-sectional overall view of one such mid-power spring brake actuator 10. The brake actuator 10 shown in FIG. 1 operates in essentially the same manner as the spring brake actuators forming the subject matter of U.S. patent application Ser. No. 11/012,313, filed Dec. 16, 2004, now U.S. patent application publication 2006/0131116 A1, and U.S. patent application Ser. No. 11/229,640, filed Sep. 20, 2005. Each respective disclosure of these prior U.S. patent applications is expressly incorporated herein by reference as non-essential material.

The brake actuator 10 has a service brake actuation chamber 12 and a parking or emergency brake de-actuation chamber 14, and includes a first, preferably cast metal or metal alloy housing portion 16, a second housing portion 18, and a third housing portion 20 disposed on a side of the first housing portion 16 opposite the second housing portion 18. The second housing portion 18 may be referred to as a "front" housing portion, as it is located closest to a vehicle brake to which the actuator 10 is to be connected. The third housing portion 20 correspondingly may be referred to as a "rear" housing portion, and the first housing portion 16 may be referred to as an "intermediate" housing portion. Thus, in FIG. 1, "front" is the direction toward the right side, and "rear" is the direction toward the left side.

Operating elements of the brake actuator 10 include an intermediate parking or emergency brake actuator spring 22, which has one end located on a spring seat at the bottom of a recess 24 defined by an annular dividing wall 15 of the intermediate housing portion 16, and an opposite end resting on a rear-facing side of an intermediate spring plate 26. Seals 23 fluid-tightly separate the service brake actuation chamber 12 from the recess 24 receiving the spring 22 in the illustrated embodiment, but permit movement of the intermediate spring plate 26 along an inner wall surface of the first housing portion 16 as will be described. It is to be understood that the brake actuator spring 22 could be either a coil spring, as illustrated, or any other type of elastic member which provides the energy storage and return function required by a parking brake actuator, such as multiple coil springs, leaf springs, cantilevered springs, resilient blocks, or chargeable high pressure bladders.

Also included in the brake actuator 10 are a parking brake release actuator 28, a service brake apply actuator 30, a brake actuator rod 32, and a push/pull connecting shaft 34. The push/pull connecting shaft 34 extends through a central aperture 40 formed in the dividing wall 15 and is displaceable with respect to that dividing wall. A bearing or bearings 42 and a seal or seals 44 are provided within the central aperture 40 to provide for fluid tight reciprocation of the connecting shaft 34 within the aperture. The parking brake release actuator 28 in this embodiment includes a diaphragm seal 36 and a parking piston 38. As illustrated, the radial outer edge 31 of the diaphragm seal 36 is clamped between adjacent ends of the intermediate and rear housing portions 16, 20, while the radial inner edge 33 of the diaphragm seal 36 is retained on an end of the parking piston 38 by molded in pockets 35 or a ring clip (not shown). The brake de-actuation chamber 14 is thus defined within a volume delimited by the first housing portion 16, the parking brake release actuator 28, and the connecting shaft 34.

The parking brake release actuator 28 is shown in FIG. 1 in the fully withdrawn position. This position is achieved when sufficient pneumatic pressure to overcome the spring force developed by brake actuator spring 22 has been supplied, via a supply port (not illustrated), to the brake de-actuation chamber 14. Opposite the brake de-actuation chamber 14, the third housing portion 20 has vent holes (not shown) vented to atmosphere.

The service brake apply actuator 30 in this embodiment includes a flexible diaphragm seal 50 attached at its outer circumference 52 between adjacent ends of the intermediate and front housing portions 16, 18. A conventional clamping ring 54, adjustable by way of a threaded element 56, may be used to secure the housing portions 16, 18 and the outer seal circumference 52 together. The actuator additionally includes a supporting element 58, such as the illustrated plate or disc, disposed on the front side of the seal 50. A portion of, or an extension attached to, the brake actuator rod 32 abuts against a central area of the element 58. As shown in FIG. 1, an extension 60 is attached to the actuator rod 32 and abuts the element 58.

The second housing portion 18 shown in FIG. 1 includes a substantially cylindrical portion 18a and a substantially radially extending forward end 18b. In the illustrated configuration, bolts 62 are provided to secure the forward end 18b to appropriate vehicle structure, although the overall brake actuator 10 could be attached to such structure in any other suitable manner. The forward end 18b has a central opening 63 within which the brake actuator rod 32 and/or its extension 60 may reciprocate. A protective bellows seal 64 extends between the brake actuator rod 32 and/or its extension 60 and an edge or edges 66 of the central opening 63. Ventilation ports 68 are provided in the second housing portion 18 to provide fluid communication between the interior of the second housing portion and the atmosphere. A service brake return spring 70 is provided so as to bias the supporting element 58 away from the second housing portion end 18b and towards the third housing portion 20. This return spring 70 may be of any appropriate type, but in the embodiment illustrated, is formed by a compression coil spring extending, coaxially with the brake actuator rod 32 and/or its extension 60, between spring seats defined by the supporting element 58 and the end 18b.

It is apparent from FIG. 1 that the service brake actuation chamber 12 is defined within a volume delimited by an expanded flange 72 defined at a front end of the connecting shaft 34, the front surface of the intermediate spring plate 26, seals 23 and 50, and an inner circumferential surface of the intermediate housing portion 16. Actuation and release of a vehicle service brake can be effected, when the vehicle is running and the parking or emergency brake de-actuation chamber 14 is pressurized, by supplying air through an appropriate feed line to the service brake actuation chamber 12 and discharging the air supplied to the chamber 12, respectively. Increasing pressurization of the chamber 12 results in a force acting on the element 58 which overcomes the force applied by the return spring 70, thereby moving the brake actuator rod 32 in a brake application direction, i.e. to the right in FIG. 1. Decreasing pressurization of the chamber 12, of course, permits movement of the rod 32 and the element 58 in an opposite, service brake release direction, i.e. to the left in FIG. 1.

When a brake fluid supply system failure occurs, or when the vehicle is no longer running, the parking or emergency brake de-actuation chamber 14 is depressurized. A pressure loss in the chamber 14 permits the intermediate brake actuator spring 22 to expand, thereby displacing the intermediate spring plate 26 toward the second housing portion 18, i.e. toward the front of the actuator 10. The spring plate 26 is seated on the expanded flange 72 defined at the front end of the connecting shaft 34. As the brake actuator spring 22 is stronger than the return spring 70, for example by having a force constant which is greater than that of the return spring 70, the shaft 34 is displaced through the aperture 40 to the right in FIG. 1 and, in turn, displaces the element 58 and the brake actuator rod 32 in a brake application direction. Pressurizing the chamber 14 again, upon fluid supply system repair or when the vehicle is again running, displaces the shaft 34 in an opposite direction, compresses the spring 22, and discontinues parking or emergency brake application. During normal vehicle operation, the intermediate brake actuator spring 22 remains compressed, and service brake application and release is performed by respective pressurization of and relief of pressure from the service brake actuation chamber 12.

Figure 2:
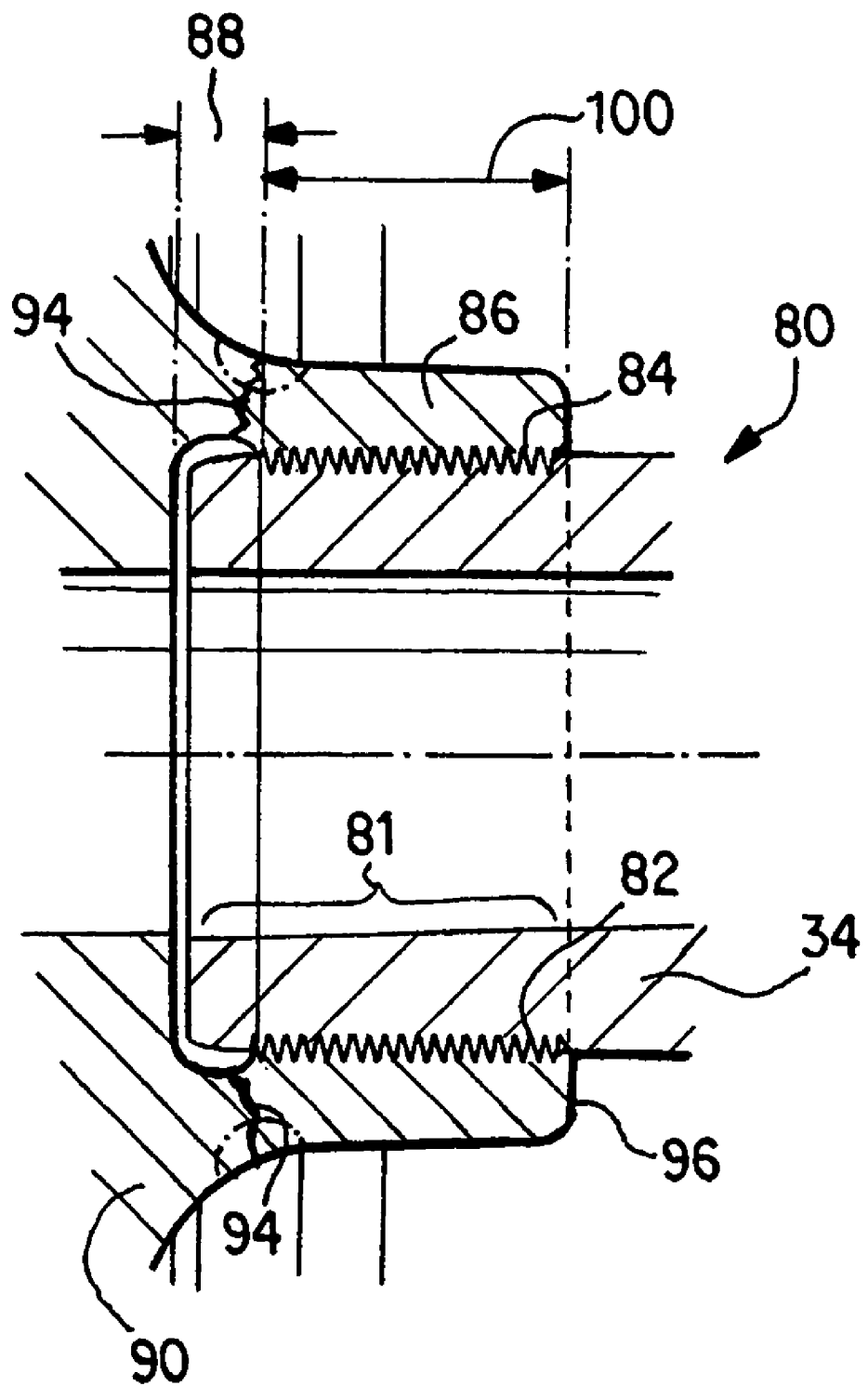
FIG. 2 is an enlarged sectional view showing the manner in which the connecting shaft and the parking piston of the actuator shown in FIG. 1 are interconnected.

The push/pull connecting shaft 34 is attached to the parking piston 38 at an end 80 thereof opposite the expanded flange 72. The connecting shaft and the parking piston are interconnected in a way which is uniquely designed to prevent undesirable or unsafe power spring expansion or release beyond a desired stroke length upon failure of the shaft and piston connection due to fatigue caused by fluctuating stresses. As best illustrated in FIG. 2, a cylindrical segment or section 81 at the end 80 of the push/pull connecting shaft 34 includes external threads 82 thereon. These external threads 82 are receivable over an approximate length 100 in corresponding internal threads 84 provided in a collar ("fuse-collar") 86 defined at approximately the center of the parking piston 38. Although the end 80 and the collar 86, as illustrated, are interconnected or "fused" by mating threads, it is to be understood that other appropriate connection types, including but not limited to plastic deformation (press-fitting), welding, brazing, and/or interlocking connections, could be used to fasten the end 80 of the connecting shaft 34 within the collar 86.

The collar 86, as illustrated, is integrally formed with the rest of the parking piston 38, which includes a piston head section 90 and a juncture or union section 88. The juncture or union section 88 of the piston 38 joins or connects the collar 86 with the piston head section 90, and includes an undercut or undercuts, as shown in FIGS. 1 and 2, machined into its inner (solid in FIG. 2) and/or outer (phantom in FIG. 2) circumference or surface, i.e. the inner and/or outer circumference or surface of that junction or union section. Other methods such as casting or molding may be used to create the undercut. The presence of the undercut or undercuts promotes failure of the shaft and piston connection at approximately failure locations 94. Failure at the locations 94, in turn, results in retention of the threaded collar 86 in position at the end 80, even though the remainder of the parking piston 38 is biased to the left as seen in FIG. 1 by fluid pressure in the parking or emergency brake de-actuation chamber 14. Undercut dimensions may be determined by finite element analysis (FEA), and failure modes may be verified through fatigue tests of prototype units.

Since the internally threaded collar 86 remains attached to the end 80 of the shaft 34, during failure of the connecting shaft and parking piston interconnection at the location or locations 94, an end 96 of the collar 86 will be forced into abutment with a shoulder 98 surrounding the central aperture 40 through which the push/pull connecting shaft 34 extends. Travel of the shaft 34 as a result of force applied by the brake actuator spring 22 during such failure is thus limited by abutment between the collar end 96 and the shoulder 98, and a cage for the spring 22 is thus formed so that undesirable or unsafe expansion or release of the power spring beyond its rated stroke upon failure of the connecting shaft can be avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A mid-power spring brake actuator comprising:
   first, second, and third actuator housing portions, the first actuator housing portion interposed between the second and third housing portions,
   a parking brake release actuator received within the third housing portion,
   a connecting shaft attached at a first end to the parking brake release actuator and extending through a dividing wall defined by the first housing portion,
   a service brake apply actuator received within at least one of the first and second housing portions,
   a brake actuator spring interposed between the dividing wall defined by the first housing portion and a second end of the connecting shaft,
   a service brake actuation chamber provided between the brake actuator spring and the service brake apply actuator, and
   a parking or emergency brake de-actuation chamber defined between the parking brake release actuator and the first housing portion,
   wherein travel of the connecting shaft as a result of force applied by the brake actuator spring upon failure of an interconnection between the connecting shaft and the parking brake release actuator is limited so as to inhibit undesired expansion of the brake actuator spring.

2. The actuator according to claim 1, wherein the parking brake release actuator includes a parking piston having a collar defined thereon receiving said first end of the connecting shaft.

3. The actuator according to claim 2, wherein the parking piston includes a juncture or union section between the collar and a piston head section configured so as to promote failure of said interconnection at least at one predetermined location.

4. The actuator according to claim 3, wherein failure of said interconnection at said predetermined location results in retention of the collar on the connecting shaft upon said failure.

5. The actuator according to claim 4, wherein said travel is limited by abutment between the collar and the dividing wall upon said failure.

6. The actuator according to claim 3, wherein the connecting shaft is received within said collar, and wherein the juncture or union section includes at least one undercut defined therein which promotes failure at said predetermined location.

7. The actuator according to claim 6, wherein said travel is limited by abutment between the collar and the dividing wall upon said failure.

8. The actuator according to claim 6, wherein the undercut is defined in at least one of an inner circumferential surface and an outer circumferential surface of the juncture or main section.

9. The actuator according to claim 3, wherein said travel is limited by abutment between the collar and the dividing wall upon said failure.

10. The actuator according to claim 2, wherein said travel is limited by abutment between the collar and the dividing wall upon said failure.

11. The actuator according to claim 2, wherein said collar is secured to the first end of the connecting shaft by threads.

12. The actuator according to claim 2, wherein said collar is secured to the first end of the connecting shaft by press-fitting.

13. The actuator according to claim 2, wherein said collar is secured to the first end of the connecting shaft by welding.

14. The actuator according to claim 2, wherein said collar is secured to the first end of the connecting shaft by brazing.

15. The actuator according to claim 2, wherein said collar is secured to the first end of the connecting shaft by an interlocking connection.

16. The actuator according to claim 2, wherein said collar is secured to the first end of the connecting shaft by molding.

17. The actuator according to claim 2, wherein said collar is secured to the first end of the connecting shaft by casting.

18. A mid-power spring brake actuator comprising:
   first, second, and third actuator housing portions, the first actuator housing portion interposed between the second and third housing portions,
   a parking brake release actuator received within the third housing portion,
   a parking or emergency brake de-actuation chamber defined between the parking brake release actuator and the first housing portion,
   a connecting shaft attached at a first end to the parking brake release actuator and extending through a dividing wall defined by the first housing portion, a service brake apply actuator received within at least one of the first and second housing portions, biasing means interposed between the dividing wall defined by the first housing portion and a second end of the connecting shaft for producing brake operation, a service brake actuation chamber provided between the biasing means and the service brake apply actuator, and means for limiting travel of the connecting shaft as a result of force applied by the biasing means upon failure of an interconnection between the connecting shaft and the parking brake release actuator so as to inhibit undesired expansion of the biasing means.

19. The actuator according to claim 18, wherein the parking brake release actuator includes a parking piston having a collar defined thereon receiving said first end of the connecting shaft.

20. The actuator according to claim 19, wherein the parking piston includes a juncture or union section between the collar and a piston head section configured so as to promote failure of said interconnection at least at one predetermined location.

21. The actuator according to claim 20, wherein failure of said interconnection at said predetermined location results in retention of the collar on the connecting shaft upon said failure.

22. The actuator according to claim 18, wherein said travel is limited by abutment between the collar and the dividing wall upon said failure.

* * * * *